United States Patent [19]

Kaneko et al.

[11] Patent Number: 4,468,257
[45] Date of Patent: Aug. 28, 1984

[54] WASHING AND REMOVAL METHOD OF HIGH MOLECULAR SUBSTANCES

[75] Inventors: Masahiro Kaneko; Tadashi Asanuma, both of Izumi; Nobutaka Uchikawa, Takaishi; Ichiro Fujio, Izumi; Tetsunosuke Shiomura, Takaishi, all of Japan

[73] Assignee: Mitsui Toatsu Chemicals, Incorporated, Tokyo, Japan

[21] Appl. No.: 389,764

[22] Filed: Jun. 18, 1982

[30] Foreign Application Priority Data

Jun. 19, 1981 [JP] Japan .................................. 56-93796
Jul. 9, 1981 [JP] Japan .................................. 56-106271

[51] Int. Cl.³ .......................... B08B 9/08; B01D 3/14
[52] U.S. Cl. .............................. 134/22.13; 134/22.14; 134/22.17; 134/22.19; 134/12; 203/72; 203/76; 528/484; 422/901
[58] Field of Search ..................... 203/72, 14, 76, 81, 203/74, 83, 96, 7-9; 134/22.14, 22.13, 22.19, 22.17, 12, 40, 2, 22.1; 422/901, 131; 202/241; 528/484

[56] References Cited

U.S. PATENT DOCUMENTS

| | | | |
|---|---|---|---|
| 2,678,304 | 5/1954 | Buchner et al. | 134/22.19 |
| 3,476,656 | 11/1969 | Van Tassell et al. | 203/72 |
| 3,997,360 | 12/1976 | Testa et al. | 134/22.19 |
| 3,998,655 | 12/1976 | Benetta et al. | 134/22.19 |
| 4,043,874 | 8/1977 | Testa et al. | 134/12 |

FOREIGN PATENT DOCUMENTS

55-8087 3/1980 Japan .

*Primary Examiner*—Wilbur L. Bascomb, Jr.
*Attorney, Agent, or Firm*—Fisher, Christen & Sabol

[57] ABSTRACT

Method of adding water and a hydroxide of an alkali metal or alkaline earth metal to a washing solvent such as an alkylamide and/or alkylsulfoxide when washing and removing high molecular substances stuck on the interior of a production apparatus or molding machine for an aromatic vinyl-acrylonitrile copolymer. A method for regenerating and recovering the washing solvent used for the above-mentioned washing and removal by means of an evaporator and distillation tower.

2 Claims, 1 Drawing Figure

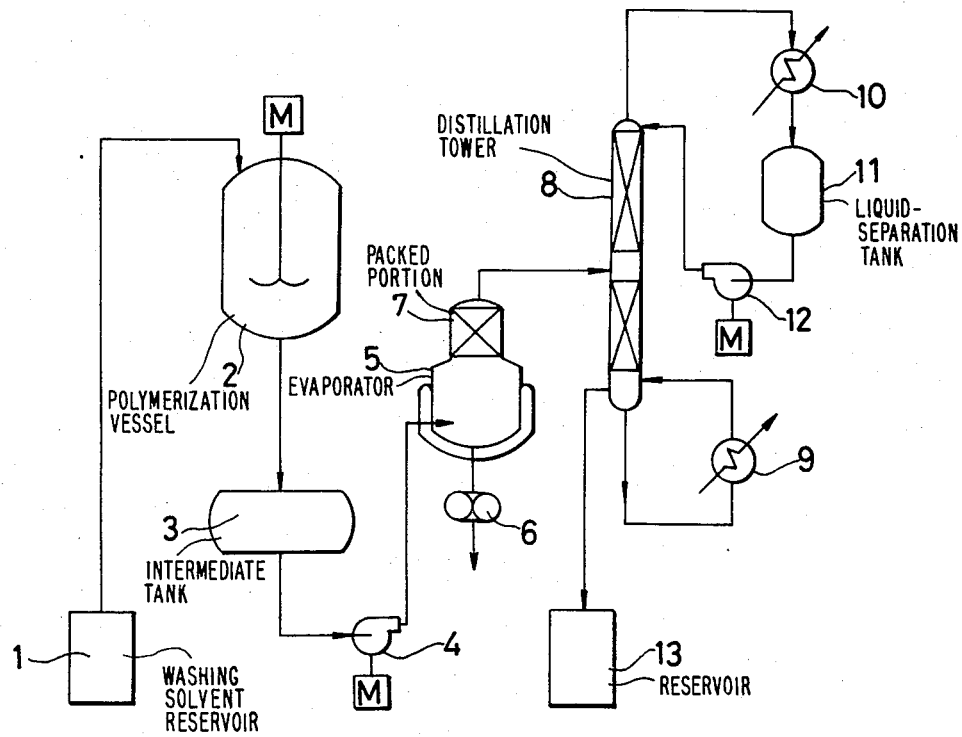

WASHING AND REMOVAL METHOD OF HIGH MOLECULAR SUBSTANCES

BACKGROUND OF THE INVENTION (1) Field of the Invention

This invention relates to a method for washing high molecular substances stuck on the interior of a production apparatus or molding apparatus for an aromatic vinyl-acrylonitrile copolymer as well as a method for regenerating and recovering the solvent which has been used in the above washing method.

(2) Description of the Prior Art

It has been known that, upon producing or molding an aromatic vinyl-acrylonitrile copolymer, high molecular substances which are insoluble or hardly soluble in the monomers or polymerization solvent generally stick on the interior of the production apparatus or molding machine.

These high molecular substances principally occur in reaction vessels and heat transfer devices, thereby lowering their heat transfer capacity and inducing pipe clogging and creating serious obstacles for steady operation due to lowered controllability of reactions and lowered productivity. Furthermore, parts of the thus-stuck high molecular substances mix in the products and damage their appearance and hues. Under the circumstances, it is necessary to interrupt the operation frequently so as to remove high molecular substances which have stuck on apparatus.

The removal of the above-mentioned high molecular substances may be effected manually. However, this method is accompanied by such drawbacks that it not only requires lots of man power and working time but also induces breakage of apparatus and contamination of workers due to chemical substances remaining in the apparatus. Alternatively, the thus-stuck high molecular substances may be peeled off and removed by means of a high pressure fluid. This method may however not be relied upon if the apparatus includes spots where the high pressure fluid does not have any direct access due to the structure of the apparatus or if the apparatus is not strong enough to apply this method.

In order to avoid the above-mentioned drawbacks, washing is usually carried out with a solvent. Here, it is necessary to employ a solvent which is capable of dissolving polymers, because a monomeric solvent has poor solubility at low temperatures and, at high temperatures, it then undergoes polymerization. For example, alkylamides such as dimethylformamide and alkylsulfoxides such as dimethylsulfoxide are known to be effective solvents to aromatic vinyl-acrylonitrile copolymers. However, some of cross-linked or modified high molecular substances may still not be dissolved in such solvents and remain in the apparatus. Such undissolved high molecular substances serve as nuclei and induce deposition of fresh high molecular substances thereon. Moreover, high molecular substances, which have not been completely dissolved and removed, are discolored under the influence of the solvent and heat. If they are caused to mix in products, their quality, notably, their hues will be damaged.

As a still alternative washing method, Japanese patent publication No. 8087/1980 discloses to dissolve and remove gelated substances, which occur upon producing high-nitrile vinyl resins containing acrylonitrile as much as at least 50 mole %, using a solution which contains an alkali metal, alkaline earth metal and the like. The dissolution capacity of such a solution has, however, been found insufficient when it is applied to high molecular substances occurred upon producing low-nitrile vinyl resins.

Generally speaking, the high molecular substances of the above type are in a swollen state due to inclusion of monomers for aromatic vinyl-acrylonitrile copolymers. They thus contain lots of monomers. Due to such monomers, when washing such high molecular substances with a solvent, the monomers are caused to mix in the solvent and reduce the washing capacity of the solvent. In some instances, the capacity of washing high molecular substances may reach its lower limit even after a single washing operation. For instance, when producing a styrene-acrylonitrile copolymer by the continuous bulk polymerization method, high molecular substances and monomers are present in high concentrations in the polymerization vessel upon completion of the polymerization. In the case of washing the polymerization vessel with a washing solvent in accordance with the batch method, the concentration of the monomers and the like in the resultant washing reaches 2–20 wt. %, or normally 6–12 wt. %. Thus, the washing is unsuitable for its reutilization as a washing solvent. In this case, it is necessary to recover and purify the washing solvent. The interior of a polymerization vessel may be dried to drive off monomers with a view toward avoiding any substantial concentration increase of the monomers in the washing solvent. However, further problems arise from this method, because it requires a long drying period of time and it is difficult for workers to carry out.

Since washing solvents are generally expensive, it is necessary to recover and reuse them. The recovery of such solvents cannot be effected by the filtration method or absorption method, because high molecular substances and monomers have to be separated therefrom. The routinely-employed recovery procedure makes use of a distillation treatment. Due to the presence of high molecular substances, the washing solvent and monomers are collected as a fraction of distillate in accordance with the batch method and then high molecular substances are separated. However, such a batch-type distillation operation is accompanied by many drawbacks, since a large portion of the solvent is lost upon distilling monomers, the distillation operation is time-consuming, and the distillation apparatus becomes unavoidably large and large expenses will be required for the facilities when washings are treated in a large quantity.

SUMMARY OF THE INVENTION

An object of this invention is to provide a method for washing and removing high molecular substances which stick, upon producing or molding an aromatic vinyl-acrylonitrile copolymer, on the production apparatus or molding machine.

Another object of this invention is to provide a method for recovering a washing solvent which has been used to wash and remove high molecular substances stuck on the interior of a production apparatus or molding machine for aromatic vinyl-acrylonitrile copolymers.

BRIEF DESCRIPTION OF THE DRAWING

The drawing is a flow sheet of one embodiment of a system adapted to recover, in accordance with this invention, a washing solvent which has been used to wash and remove high molecular substances stuck on the interior of a polymerization vessel.

DETAILED DESCRIPTION OF THE PREFERRED EMBODIMENTS

This invention involves a method for washing and removing high molecular substances stuck on the interior of a production apparatus or molding machine for an aromatic vinyl-acrylonitrile copolymer by using one or more solvents selected from the group consisting of alkylamides and alkylsulfoxides, which method comprises allowing a solution containing 0.03–3.0 wt. % of water based on said one or more solvents and $1.0 \times 10^{-4}$–$1.0$ gram equivalent of at least one hydroxide represented by the general formula (I) per every liter of said one or more solvents:

$$M(OH)_n \qquad (I)$$

wherein n stands for an integer of 1 or 2, M denotes an alkali metal when n=1 or an alkaline earth metal when n=2.

The aromatic vinyl-acrylonitrile copolymer, to which the present invention may be applied, is a low-nitrile vinyl resin containing 5–33 wt. % of acrylonitrile. It may contain another nitrile monomer such as methacrylonitrile instead of acrylonitrile. As aromatic vinyl monomers, may be mentioned styrene, α-methylstyrene and the like. For the production of such a copolymer, the suspension polymerization method, solution polymerization method or bulk polymerization method may be suitably applied.

As the one or more solvents selected from the groups consisting of alkylamide and alkylsulfoxides, dimethylformamide, dimethylacetamide, dimethylsulfoxide and mixtures thereof may be mentioned. These solvents may further contain monomers such as acrylonitrile, methacrylonitrile, styrene and/or α-methylstyrene, aromatic hydrocarbons such as benzene, toluene and ethylbenzene, and other solvents such as acetone and methyl ethyl ketone, to a certain minor extent.

The water, which is caused to exist with the washing solvent, is required to range 0.03–3.0 wt. % based on the washing solvent. Outside the above range, its capacity to dissolve high molecular substances will be lowered.

The hydroxide having the general formula (I), which is also allowed to exist together with the above washing solvent, means, specifically speaking, lithium hydroxide, sodium hydroxide, potassium hydroxide, cesium hydroxide, calcium hydroxide, barium hydroxide or the like. It is incorporated in an amount of, normally, $1.0 \times 10^{-4}$–$1.0$ gram equivalent, and preferably, $1 \times 10^{-3}$–$1.0$ gram equivalent per every liter of the washing solvent.

To cause a solution of water and the hydroxide to exist concurrently with the washing solvent, the solution of water and the hydroxide may be added in advance to the washing solvent or the solution may be added during each washing operation of high molecular substances by the washing solvent. For example, after charging the washing solvent into a polymerization vessel, the solution of water and the hydroxide may be added and heated under stirring. Alternatively, after removing beforehand parts of stuck high molecular substances with the aforementioned monomer or a suitable solvent, the washing of the high molecular substances may be effected with the washing solvent containing the solution of water and the hydroxide in accordance with this invention.

When washing and removing high molecular substances in accordance with the method of this invention, there is no particular limitation to be vested on the temperature. Suitable washing temperatures may be selected depending on locations where high molecular substances stick or apparatus to which the present washing method is applied. The efficiency of washing may be enhanced further by employing temperatures near the glass transition temperature of each high molecular substance or higher than that.

When washing and removing high molecular substances stuck on the apparatus upon producing or molding an aromatic vinyl-acrylonitrile copolymer using a washing solution which consists of one or more solvents selected from alkylamides and alkylsulfoxides and which also contains a solution of water and a hydroxide in accordance with this invention, substantially complete washing and removal of the high molecular substances can be effected in a shorter period of time compared with the conventional solvent-washing method. In other words, the working time and frequency required for the removal of high molecular substances will be reduced and the adverse effect to the quality of products due to high molecular substances not removed for incomplete washing work but left in the apparatus will be considerably reduced. Thus, the present invention can bring about outstanding economical effects.

In another aspect of this invention, there is also provided a method for recovering a washing solvent consisting of dimethylformamide, dimethylacetamide and dimethylsulfoxide from washings which contain high molecular substances and monomers and have resulted from washing and cleaning with the washing solvent the high molecular substances stuck on the interior of an apparatus adapted to produce an aromatic vinyl-acrylonitrile copolymer, which method comprises:

(a) introducing the washings continuously into an evaporator;

(b) causing the washing solvent and monomers to evaporate and separating the high molecular substances contained in the washings in the evaporator;

(c) supplying a mixture of the washing solvent and monomers, which have evaporated in the evaporator, as vapor into a distillation tower;

(d) at the same time, supplying water into the distillation tower to draw from the top of the distillation tower a distillate fraction consisting principally of an azeotropic mixture of water and the monomers;

(e) separating the fraction of distillate into a phase consisting principally of water and another phase consisting principally of the monomers;

(f) using a part or the whole of the phase, which consists principally of water, as water to be supplied in step (d); and (g) recovering from the bottom of the distillation tower the washing solvent which has been purified.

The aromatic vinyl-acrylonitrile copolymer, to the present invention can be applied, contains preferably 10–50 wt. % of acrylonitrile, and more preferably 20–40 wt. % of acrylonitrile. It may contain another nitrile monomer such as methacrylonitrile in place of acrylonitrile. As an exemplary aromatic vinyl monomer, may be mentioned styrene or α-methylstyrene. The copolymer may be produced by any polymerization method, including the suspension polymerization, solution polymerization and bulk polymerization methods. Particularly when the solution or bulk polymerization method is applied, high molecular substances stuck on the interior of the polymerization vessel are swollen due to monomers and the like confined thereto. Thus, a particularly great advantage will be brought about when the present invention is applied to such a polymerization vessel. Monomers, which make up the aromatic vinyl-acrylonitrile copolymer, are acrylonitrile, methacrylonitrile, styrene, α-methylstyrene, etc. as mentioned above. They are supposed to form azeotropic mixtures with water but they are not supposed to dissolve readily in water. They may also include solvents usable as polymerization solvents upon conducting polymerization and capable of forming azeotropic mixtures with water but hardly soluble in water, such as benzene, toluene, xylene, ethylbenzene, hexane, heptane and the like.

The washing solvent useful to practice the method according to the second aspect of this invention contains, as mentioned above, one solvent selected from the group consisting of dimethylformamide, dimethylacetamide and dimethylsulfoxide as the principal component thereof. Dimethylformamide is particularly suitable for styrene-acrylonitrile copolymers.

Washings, resulted from washing work and containing high molecular substances and monomers, are then introduced into an evaporator which has a capacity to cause the washing solvent to evaporate continuously. As such an evaporator, a flash evaporator, falling-film evaporator or agitation vessel may be used. It is also possible to carry out the separation and discharge operation of the high molecular substances in the evaporator. This evaporation operation may be conducted under elevated pressures, atmospheric pressure or reduced pressures. It is generally suitable to conduct the evaporation operation under atmospheric pressure since the evaporation operation under atmospheric pressure is easier.

The thus-evaporated washing solvent, which contains the monomers, is then guided to a distillation tower without undergoing condensation but in a vapor form to separate the washing solvent and monomers from each other. As the distillation tower, a packed tower or plate tower is generally used. Distillation is normally carried out under atmospheric pressure or reduced pressures. Under such pressures, 4–20 stages are sufficient for the distillation tower. It is advantageous to supply the vapor mixture of the washing solvent and monomers between the bottom and middle stage, and normally at a stage several stages down from the middle stage.

The distillation tower is supplied with water to remove the monomers. The distillate taken out from the top of the distillation tower and consisting principally of an azeotropic mixture of water and monomers is separated into a phase consisting principally of the monomers and another phase consisting mainly of water. For this separation work, a settling tank is usually employed. A part or the whole of the thus-separated latter phase, which consists mainly of water, may be constantly recirculated as reflux, thereby making it possible to use water in a closed system. The supply of water may generally be carried out by either providing water in the settling tank prior to the initiation of each distillation operation and using it as reflux or charging water or steam into the distillation tower. It is also possible to supply water when the washing solvent is introduced into the evaporator.

The former phase, which has been separated through the settling separation and consists principally of the monomers, is removed by drawing it out either continuously or in accordance with the batch method.

A heating device such as steam jacket or reboiler is provided for rectification at the bottom of the distillation tower. The thus-rectified washing solvent is either recovered from the bottom and stored or recycled to the production apparatus for washing it.

When the present invention is applied to dimethylformamide which has been used to wash a production apparatus for a styrene-acrylonitrile copolymer, it is generally feasible to recover 95wt. % or more of the dimethylformamide with a purity exceeding 99% by weight.

According to the method of this invention, it is possible to carry out effectively the recovery of a washing solvent which has been used to wash a production apparatus for an aromatic vinyl-acrylonitrile copolymer. Owing to the continuous recovery of the washing solvent, the monomers and the like can be removed effectively and a high recovery rate is available for the washing solvent. Furthermore, it is also possible to shorten the time required for washing and, at the same time, to save the expensive washing solvent by supplying the thus-recovered washing solvent back to the polymerization vessel.

The present invention will hereinafter be described specifically in the following examples.

EXAMPLES 1-5

Using a production apparatus for styrene-acrylonitrile copolymers, five (5) types of styrene-acrylonitrile copolymers having different acrylonitrile contents were each produced for one month by the continuous bulk polymerization method. In the production of each of the copolymers, the production apparatus was provided with a test piece of a 3 cm×3 cm stainless steel to cause high molecular substances to stick on the test piece.

Thereafter, these test pieces were placed in a flask having a capacity of 1000 ml, in which they were washed at 130° C. with 500 ml of dimethylformamide, a solvent, and a solution of $4.0 \times 10^{-3}$ gram equivalent of NaOH per liter of the solvent and 1.0 wt. % of water based on the solvent while stirring the solvent and solution. Test results are shown in Table 1 as Examples 1-5.

COMPARATIVE EXAMPLES 1-5

Washing tests were carried out in exactly the same way as in Examples 1-5, except that a washing solution containing 500 ml of dimethylformamide as a solvent and a solution which consists in turn of $4.0 \times 10^{-3}$ gram equivalent of NaOH per liter of the solvent and 4.0 wt. % of water based on the solvent. Test results are tabulated in Table 1 as Comparative Examples 1-5.

COMPARATIVE EXAMPLES 6-10

Washing tests were carried out in exactly the same way as in Examples 1-5, except that a washing solution containing 500 ml of dimethylformamide as a solvent and a solution which consists in turn of $4.0 \times 10^{-3}$ gram equivalent of NaOH per liter of the solvent and 0.01 wt. % of water based on the solvent. Test results are given in Table 1 as Comparative Examples 6-10.

TABLE 1

| No. | | Acrylonitrile Content in Resin Produced by Apparatus Equipped with Test Piece (wt. %) | Time Required to Remove High Molecular Substances (hrs.) |
|---|---|---|---|
| Example | 1 | 5 | 8 |
| | 2 | 10 | 8 |
| | 3 | 24 | 5.5 |
| | 4 | 33 | 5 |
| | 5 | 50 | 4 |
| Comparative Example | 1 | 5 | Over 96 hours* |
| | 2 | 10 | 4.0 |
| | 3 | 24 | 35 |
| | 4 | 33 | 29 |
| | 5 | 50 | 8 |
| | 6 | 5 | 60 |
| | 7 | 10 | 37 |
| | 8 | 24 | 28 |
| | 9 | 33 | 20 |
| | 10 | 50 | 4 |

Note:
*Even after washing for 96 hours, 21 wt. % of the stuck high molecular substances still remained.

EXAMPLES 6-26

Test pieces obtained in Example 3, i.e., obtained by placing them in a production apparatus for a styrene-acrylonitrile copolymer containing 24 wt. % of acrylonitrile and causing high molecular substances to stick thereon were subjected to a washing test in the same device as in Examples 1-5, using 21 different types of washing solutions given in Table 2. Test results are shown in the same table.

TABLE 2

| Ex. No. | Solvent | Type of Hydroxide | Amount of Hydroxide Added (gram equi./l) | Water Content (wt. %) | Washing Temp. (°C.) | Time Required to Remove High Molecular Substances (hrs.) |
|---|---|---|---|---|---|---|
| 6 | Dimethylformamide (500 ml) | NaOH | $4.0 \times 10^{-3}$ | 3.0 | 130 | 8 |
| 7 | Dimethylformamide (500 ml) | NaOH | $4.0 \times 10^{-3}$ | 0.1 | 130 | 5 |
| 8 | Dimethylformamide (500 ml) | NaOH | $4.0 \times 10^{-3}$ | 0.03 | 130 | 5 |
| 9 | Dimethylformamide (500 ml) | KOH | $4.0 \times 10^{-3}$ | 3.0 | 130 | 7 |
| 10 | Dimethylformamide (500 ml) | KOH | $4.0 \times 10^{-3}$ | 1.0 | 130 | 5 |
| 11 | Dimethylformamide (500 ml) | KOH | $4.0 \times 10^{-3}$ | 0.1 | 130 | 4.5 |
| 12 | Dimethylformamide (500 ml) | KOH | $4.0 \times 10^{-3}$ | 0.03 | 130 | 4.5 |
| 13 | Dimethylformamide (500 ml) | NaOH | 1.0 | 1.0 | 130 | 4 |
| 14 | Dimethylformamide (500 ml) | NaOH | $1.0 \times 10^{-2}$ | 1.0 | 130 | 4 |
| 15 | Dimethylformamide (500 ml) | NaOH | $1.0 \times 10^{-4}$ | 1.0 | 130 | 5 |
| 16 | Dimethylformamide (500 ml) | NaOH | $4.0 \times 10^{-3}$ | 1.0 | 100 | 10 |
| 17 | Dimethylformamide (500 ml) | LiOH | $4.0 \times 10^{-3}$ | 3.0 | 130 | 5.5 |
| 18 | Dimethylformamide (500 ml) | LiOH | $4.0 \times 10^{-3}$ | 0.03 | 130 | 4 |
| 19 | Dimethylformamide (500 ml) | Ba(OH)$_2$ | $4.0 \times 10^{-3}$ | 3.0 | 130 | 6 |
| 20 | Dimethylformamide (500 ml) | Ba(OH)$_2$ | $4.0 \times 10^{-3}$ | 0.03 | 130 | 5.5 |
| 21 | Dimethylsulfoxide (500 ml) | NaOH | $4.0 \times 10^{-3}$ | 1.0 | 130 | 6 |
| 22 | Dimethylsulfoxide (500 ml) | KOH | $4.0 \times 10^{-3}$ | 1.0 | 130 | 5 |
| 23 | Dimethylacetamide (500 ml) | KOH | $4.0 \times 10^{-3}$ | 1.0 | 130 | 5 |
| 24 | Dimethylacetamide (500 ml) | LiOH | $4.0 \times 10^{-3}$ | 1.0 | 130 | 6 |
| 25 | Mixed solvent of dimethylformamide and dimethylsulfoxide (weight ratio: 50:50) (500 ml) | KOH | $4.0 \times 10^{-3}$ | 1.0 | 130 | 5.5 |
| 26 | Mixed solvent of dimethylformamide and dimethylsulfoxide (weight ratio: 50:50) (500 ml) | KOH | $4.0 \times 10^{-3}$ | 1.0 | 150 | 3 |

EXAMPLES 27-30

Washing tests were conducted at 130° C. in exactly the same way as in Examples 6-26, except that a washing solution containing 500 ml of a mixed solvent of acrylonitrile, ethylbenzene, styrene, etc., as solvent, and a solution which consisted in turn of $4.0 \times 10^{-3}$ gram equivalent of KOH per liter of the solvent and 1.0 wt. % of water based on the solvent.

Test results are given in Table 3.

TABLE 3

| Ex. No. | Type of Solvent (weight ratio) | Time Required to Remove High Molecular Substances (hrs.) |
|---|---|---|
| 27 | Dimethylformamide/ Acrylonitrile (95/5) | 6.5 |
| 28 | Dimethylformamide/ Styrene (90/10) | 6 |
| 29 | Dimethylformamide/ Ethylbenzene (90/10) | 6 |
| 30 | Dimethylsulfoxide/ Methyl Ethyl Ketone (80/20) | 7 |

EXAMPLE 31

High molecular substances, which had stuck on the interior of a polymerization vessel of an internal volume of 5 m³ after a continuous production of a styrene-acrylonitrile copolymer containing 24-33 wt. % of acrylonitrile over 2 months, were dissolved and removed in accordance with the method of this invention. Namely, 4.5 m³ of dimethylformamide, as a solvent, as well as $1 \times 10^{-2}$ gram equivalent of KOH per every liter of the solvent and 1.0 wt. % of water based on the solvent were charged in the polymerization vessel. The polymerization vessel was then washed for 5 hours at 130° C. while stirring the washing solution. Thereafter, the washing solution was taken out of the vessel and the interior of the vessel was inspected. The inner surface of the polymerization vessel had metallic gloss and no stuck high molecular substances were observed at all there.

COMPARATIVE EXAMPLE 11

In exactly the same way as in Example 31, acrylonitrile monomer was charged in a polymerization vessel which had been used to produce a styrene-acrylonitrile copolymer and carried high molecular substances stuck thereon. It was heated to 70° C. and the polymerization vessel was washed for 40 hours while stirring the acrylonitrile monomer. Then, the acrylonitrile monomer was drawn out of the vessel and the interior of the vessel was inspected. There were still lots of high molecular substances stuck on the inner surface of the polymerization vessel and manual cleaning work was additionally required.

Next, the washing solvent recovery method of this invention will be described with reference to the accompanying drawing.

EXAMPLE 32

A production of a styrene-acrylonitrile copolymer (acrylonitrile content: 24 wt. %) was carried out for straight 32 days in accordance with the bulk polymerization method. A polymerization vessel 2 of an internal volume of 5 m³, on which high molecular substances had stuck, was washed using dimethylformamide.

Upon completion of the bulk polymerization, the polymerization solution was drawn out of the polymerization vessel. At this stage, the high molecular substances stuck on the interior of the vessel were in a swollen state due to acrylonitrile and styrene as monomers, and ethylbenzene used as a polymerization solvent.

To the above polymerization vessel, dimethylformamide was supplied to its full capacity. The interior of the polymerization vessel was then washed at 130° C. for 10 hours while agitating the dimethylformamide. Upon completion of the washing, the thus-used solvent contained 8 wt. % of the monomers and 4 wt. % of high molecular substances. The solvent, which had been used for the above washing, was then delivered continuously to an evaporator 5 by means of a pump 4 through an intermediate tank 3.

This evaporator was a heating tank of 800 liters and was provided with steam and heating medium jackets and inner coil which were able to heat up to 250° C. A gear pump 6 was also provided to permit the discharge of high molecular substances from the bottom of the evaporator. A packed portion 7 of 500 mm long was also provided in an upper portion of the heating tank so as to avoid any intrusion of splash of the polymer. The evaporation operation was conducted substantially under atmospheric pressure(1.05 atoms). The evaporator was maintained at 145° C. and the resulting vapor was fed at a flow velocity of 270 Kg/hr to a distillation tower 8. This distillation was a packed tower having a diameter of 450 mm and equipped with 7 stages, 4 stages above the supply port of the vapor and 3 stages below the same supply port. This distillation tower was equipped with a reboiler 9 for heating the bottom liquid, a condenser 10 for the top vapor, a liquid-separation tank 11 (capacity: 1000 liters) for the condensate, and a pump 12 for recirculation.

To the top of the distillation tower, water, which had been stored in advance in the liquid-separation tank, was refluxed and allowed to boil together with the monomers and the like as an azeotropic mixture. The thus-drawn monomers and the like as the azeotropic mixture from the top of the distillation tower were separated in the liquid-separation tank and the resultant water phase was used as reflux. Here, the reflux ratio (R) was 5.0. In this operation, most of the monomers and the like were removed and dimethylformamide was recovered with a purity of 99.7 wt. % from the bottom of the distillation tower. The thus-recovered dimethylformamide was collected in a reservoir indicated at numeral 13.

Through the above recovery operation, 98 wt. % of the dimethylformamide was recovered.

What is claimed is:

1. Method for washing and removing high molecular substances stuck on the interior of a production apparatus upon producing an aromatic vinyl-acrylonitrile copolymer containing 5 to 33 weight percent acrylonitrile, comprising washing and removing said stuck high molecular substances from the interior of said production apparatus by using one or more solvents selected from the group consisting of an alkylamide and an alkylsulfoxide, which method comprises using, together with said one or more solvents, a mixture containing from $1.0 \times 10^{-4}$ to 1.0 gram equivalent of at least one hydroxide having the formula:

$$M(OH)_n \qquad (I)$$

wherein n is an integer of 1 or 2, and M is an alkali metal when n is 1 or an alkaline earth metal when n is 2, per liter of said one or more solvents, and 0.03 to 3.0 weight percent of water based on the amount of one or more solvents.

2. Method as claimed in claim 1 wherein said at least one hydroxide is selected from the group consisting of lithium hydroxide, sodium hydroxide, potassium hydroxide, cesium hydroxide, calcium hydroxide and barium hydroxide.

* * * * *